US007937425B2

(12) United States Patent
Krawiec et al.

(10) Patent No.: US 7,937,425 B2
(45) Date of Patent: May 3, 2011

(54) SCALABLE 2×2 ROTATION PROCESSOR FOR SINGULAR VALUE DECOMPOSITION

(75) Inventors: Wojciech J Krawiec, Amherst, NH (US); John M Smith, Nashua, NH (US); Michael J Kotrlik, Nashua, NH (US)

(73) Assignee: Frantorf Investments GmbH, LLC, Dover, DE (US)

( * ) Notice: Subject to any disclaimer, the term of this patent is extended or adjusted under 35 U.S.C. 154(b) by 1038 days.

(21) Appl. No.: 11/046,377

(22) Filed: Jan. 28, 2005

(65) Prior Publication Data

US 2006/0173948 A1 Aug. 3, 2006

(51) Int. Cl.
*G06F 15/00* (2006.01)
(52) U.S. Cl. ........................................ 708/200; 708/208
(58) Field of Classification Search .......... 708/200–212, 708/620–632, 400–409
See application file for complete search history.

(56) References Cited

U.S. PATENT DOCUMENTS

| | | | | |
|---|---|---|---|---|
| 6,041,340 | A * | 3/2000 | Mintzer | 708/403 |
| 6,864,897 | B2 * | 3/2005 | Brand | 345/582 |
| 2005/0091298 | A1 * | 4/2005 | Kalafala et al. | 708/607 |
| 2006/0106902 | A1 * | 5/2006 | Howard et al. | 708/200 |
| 2006/0123363 | A1 * | 6/2006 | Williams et al. | 716/1 |
| 2006/0155798 | A1 * | 7/2006 | Ketchum et al. | 708/607 |
| 2007/0226287 | A1 * | 9/2007 | Lin et al. | 708/490 |

OTHER PUBLICATIONS

Liu, Z. et al., "A floating-point CORDIC based SVD processor", IEEE, 2003, pp. 1-10.*
"Singular Value Decomposition (SVD)", [retrieved on Nov. 19, 2004], Retrieved from the internet <URL:http://kwon3d.com/theory/jkinem/svd.html, pp. 1-3.
Wall, Michael E. et al., "Singular value decomposition and principal component analysis", [retrieved on Nov. 19, 2004], Retrieved from the internet <URL: http://pubic.lanl.gov/mewall/kluwer2002.html, pp. 1-21.
Ahmedsaid, A. et al., "Improved SVD systolic array and implementation on FPGA", pp. 1-8.
Haller, B. et al., "Efficient Implementation of Rotation Operations for High Performance QRD-RLS Filtering", IEEE, 1997, pp. 162-174.
Hekstra, Gerben J. et al., "Fast Rotations: Low-cost arithmetic methods for orthonormal rotation", IEEE, 1997, pp. 116-125.
Fu, Dengwei et al., "A High-Speed Processor for Digital Sine/Cosine Gernation and Angle Rotation", IEEE, 1998, pp. 177-181.
Chen, Sau-Gee et al., "A New Efficient Algorithm for Singular Value Decomposition", IEEE, 1999, pp. V-523-V-526.
Xingjun, Wu et al., "Jacobi-type SVD and its Floating-point Realization Based on Fast Rotations", IEEE, 2000, pp. 583-586.
Gotze, Jurgen et al., "A CORDIC-Based Jacobi-Like Algorithm for Eigenvalue Computation", IEEE, 1993, pp. III-296-III299.
Hekstra, Gerben J. et al., "Floating Point CORDIC", IEEE, 1993, pp. 130-137.
Gotze, Jurgen, "Monitoring the Stage of Diagonalization in Jacobi-Type Methods", IEEE, 1994, pp. III-441-III-444.

(Continued)

*Primary Examiner* — Chat C Do (57) ABSTRACT

A two-plane rotation (TPR) approach to Gaussian elimination (Jacobi) is used for computational efficiency in determining rotation parameters. A rotation processor is constructed using the TPR approach to perform singular value decomposition (SVD) on two by two matrices yielding both eigenvalues and left and right eigenvectors. The rotation processor can then be replicated and interconnected to achieve higher dimensioned matrices. For higher dimensional matrices, the rotation processors on the diagonal solve the 2×2 rotation angles, broadcast the results to off-diagonal processors, whereby all processors perform matrix rotations in parallel.

12 Claims, 5 Drawing Sheets

OTHER PUBLICATIONS

Paul, Steffen et al., "Error Analysis of CORDIC-Based Jacobi Algorithms", IEEE Transactions on Computers, Jul. 1995, pp. 947-951, vol. 44, No. 7.

Gotze, Jurgen et al., "A Bit Level Algorithm for Subspace Tracking", Institute of Network Theory and Circuit Design, pp. 352-360.

De Lange, A.A.J. et al., "An Optimal Floating-Point Pipeline CMOS CORDIC Processor Algorithm, Automated Design, Layout and Performance", IEEE ISCAS, 1988, pp. 2043-2047.

Ercegovac, Milos et al., "Implemenation of Fast Angle Calculation and Rotation Using On-Line CORDIC", IEEE ISCAS, 1988, pp. 2703-2706.

Cavallaro, Joseph R. et al., "Floating-Point CORDIC for Matrix Computations", IEEE, 1988, pp. 40-42.

Cavallaro, Joseph R. et al., "VSLI Implementation of a CORDIC SVD Processor", IEEE, 1989, pp. 256-260.

Ercegovac, Milos D. et al., "Redundant and On-Line CORDIC: Application to Matrix Triangularization and SVD", IEEE Trasactions on Computers, Jun. 1990, pp. 725-740, vol. 39, No. 6.

Hu, Xiaobo et al., "Expanding the Range of Convergence of the CORDIC Algorithm", IEEE Transactions on Computers, Jan. 1991, pp. 13-21, vol. 40, No. 1.

Hu, Yu Hen, "The Quantization Effects of the CORDIC Algorithm", IEEE Transactions on Signal Processing, Apr. 1992, pp. 834-844, vol. 40, No. 4.

Hu, Yu Hen, "CORDIC-Based VLSI Architectures for Digital Signal Processing", IEEE Signal Processing, Jul. 1992, pp. 16-35.

Delosme, Jean-Marc, "Bit-Level Systolic Algorithm for the Symetric Eigenvalue Problem", IEEE, 1990, pp. 770-781.

Hemkumar, Nariankadu D. et al., "CAPE—VLSI Implementation of a Systolic Processor Array: Architecture, Design and Testing", IEEE, 1991, pp. 64-69.

Rader, C. M., "MUSE—A Systolic Array for Adaptive Nulling with 64 Degrees of Freedom, using Givens Transformations and Wafer Scale Integration", IEEE, 1992, pp. 277-291.

Hemkumar, Nariankadu D. et al., "A Systolic VLSI Architecture for Complex SVD", IEEE, 1992, pp. 1061-1064.

Gotze, Jurgen et al., "An Efficient Jacobi-like Algorithm for Parallel Eigenvalue Computation", IEEE Transactions on Computers, Sep. 1993, pp. 1058-1065, vol. 42, No. 9.

Hemkumar, Nariankadu D. et al., "Redundant and On-Line CORDIC for Unitary Transformations", IEEE Transactions on Computers, Aug. 1994, pp. 941-954, vol. 43, No. 8.

* cited by examiner

SCALABLE 2×2 ROTATION PROCESSOR FOR SINGULAR VALUE DECOMPOSITION

FIELD OF THE INVENTION

The invention relates to singular value decomposition algorithm, and more particularly, to a low-latency digital hardware solution to the singular value decomposition algorithm.

BACKGROUND OF THE INVENTION

Singular value decomposition (SVD) is a mathematical algorithm for dealing with sets of equations or matrices that are either singular or numerically very close to singular. SVD enables problems in a given matrix to be diagnosed, and provides a numerical answer as well. The importance of the SVD algorithm lies in its wide application, and core significance in a host of high performance signal processing algorithms. These include, for example, beamforming or direction finding, frequency estimation, clutter suppression, signal tracking, signal detection, data analysis, speech enhancement, and filter design.

The equation for singular value decomposition of X is represented as: $X=USV^T$. Assume X is an m×n matrix of real-value data and rank r (the rank of a matrix is the number of linearly independent rows or columns), where m≧n, and therefore r≦n. U is an m×n matrix, S is an n×n diagonal matrix, and $V^T$ is also an n×n matrix. The columns of U are called the left singular vectors. The rows of $V^T$ contain the elements of the right singular vectors. The elements of S are only nonzero on the diagonal, and are called the singular values.

One way to calculate the SVD is to first determine $V^T$ and S by diagonalizing $X^TX$ (which equals $VS^2V^T$), and then determine U (which equals $XVS^{-1}$), where the (r+1), ... ,n columns of V for which $s_k=0$ are ignored in the matrix multiplication. Choices for the remaining n-r singular vectors in the V or U matrices are then calculated using extension methods, such as the Gram-Schmidt orthogonalization process. Other conventional calculation techniques provide varying degrees of accuracy and speed in solving the SVD problem.

In any such conventional cases, solving the SVD problem is an iterative process that is time-limited by computation latency. To exacerbate this situation, higher latency scales with the size of the mantissa. In short, the SVD algorithm is computationally intensive, and this places a computational burden on real-time systems that employ it, or the algorithms that use it.

What is needed, therefore, are low-latency solutions to the singular value decomposition algorithm.

BRIEF SUMMARY OF THE INVENTION

One embodiment of the present invention provides a method for performing singular value decomposition (SVD) of a matrix using two-plane rotation. The method includes computing two-plane rotation terms of rotation and reflection based on elements of the matrix. The method continues with determining rotation angles based on the two-plane rotation terms, determining sign terms based on the two-plane rotation terms, and computing primary rotation terms based on the rotation angles and the sign terms. The method continues with computing local rotation terms based on the primary rotation terms, computing updated two-plane rotation terms based on the local rotation terms and the two-plane rotation terms, and forming an updated matrix. In one particular case, determining the rotation angles, determining the sign terms, and computing the primary rotation terms each produce results, and are only performed if solving a 2 by 2 SVD or if solving a diagonal portion of an overall matrix that is larger than a 2 by 2 SVD. In this case, the method may further include broadcasting the results relevant to solving any corresponding off-diagonal portions of the overall matrix.

The matrix can be, for example, a matrix or sub-matrix $$A = \begin{bmatrix} a_{11} & a_{12} \\ a_{21} & a_{22} \end{bmatrix},$$

and the two-plane rotation terms are $p_1$, $q_1$, $p_2$, and $q_2$, where $$p_1 = \frac{a_{22}+a_{11}}{2}, q_1 = \frac{a_{21}-a_{12}}{2},$$
$$p_2 = \frac{a_{22}-a_{11}}{2}, \text{ and } q_2 = \frac{a_{21}+a_{12}}{2}.$$

Here, rotation angles φ and γ can be determined as follows:

$$\varphi = \frac{\tan^{-1}(2^{-(exp(p_2)-exp(q_2))})}{2}, \gamma = \frac{\tan^{-1}(2^{-(exp(p_2)-exp(q_2))})}{2},$$

and where exp( ) represents an exponential component of a floating point number. Sign terms $s_1$ and $s_2$ can be determined as follows:
$s_1$=sign($p_1$) AND sign($q_1$) and $s_2$=sign($p_2$) AND sign($q_2$), where sign( ) represents a sign-bit component of the floating point number. Primary rotation terms $\sin\theta_R$, $\sin\theta_L$, $\cos\theta_R$, and $\cos\theta_L$ can be determined as follows: $\sin\theta_R=s_2 \sin\gamma \cos\phi+s_1 \cos\gamma \sin\phi$, $\sin\theta_L=s_2 \sin\gamma \cos\phi-s_1 \cos\gamma \sin\phi$, $\cos\theta_R=\cos\gamma \cos\phi-s_1 s_2 \sin\gamma \sin\phi$, and $\cos\theta_L=\cos\gamma \cos\phi+s_1 s_2 \sin\gamma \sin\phi$.

Local rotation terms $\sin\theta_+$, $\cos\theta_+$, $\sin\theta_-$, and $\cos\theta_-$ can be determined as follows: $\sin\theta_+=\sin\theta_R \cos\theta_L+\cos\theta_R \sin\theta_L$, $\cos\theta_+=\cos\theta_R \cos\theta_L-\sin\theta_R \sin\theta_L$, $\sin\theta_-=\sin\theta_R \cos\theta_L-\cos\theta_R \sin\theta_L$, and $\cos\theta_-=\cos\theta_R \cos\theta_L+\sin\theta_R \sin\theta_L$. Updated two-plane rotation terms $r_1$, $t_1$, $r_2$, and $t_2$ can be determined as follows $r_1=p_1 \cos\theta_++q_1 \sin\theta_-$, $t_1=q_1 \cos\theta_--p_1 \sin\theta_-$, $r_2=p_2 \cos\theta_++q_2 \sin\theta_+$, and $t_2=q_2 \cos\theta_+-p_2 \sin\theta_+$. Note that the $r_1$ and $t_1$ terms are the difference and sum respectively when computing the U or V matrice. In this example, then, the updated matrix is $$A' = \begin{bmatrix} r_1-r_2 & t_2+t_1 \\ t_1-t_2 & r_1+r_2 \end{bmatrix}.$$

Another embodiment of the present invention provides a system for performing singular value decomposition (SVD) of a matrix using two-plane rotation. The system includes an array of 2 by 2 rotation processors configured to match the dimensionality of the matrix (extended by processors until square, with zero padded data if non-square), with each rotation processor being a diagonal or an off-diagonal processor. The diagonal processors are configured to compute two-plane rotation terms of rotation and reflection based on elements of the matrix, determine rotation angles based on the two-plane rotation terms; determine sign terms based on the two-plane rotation terms, compute primary rotation terms based on the rotation angles and the sign terms, compute local rotation terms based on the primary rotation terms, compute updated two-plane rotation terms based on the local rotation terms and the two-plane rotation terms, and form an updated matrix. The off-diagonal processors are configured to compute two-plane rotation terms of rotation and reflection based on elements of the matrix, compute local rotation terms based on the primary rotation terms, compute updated two-plane rotation terms based on the local rotation terms and the two-plane rotation terms, and form an updated matrix. Here, the rotation angles, sign terms, and primary rotation terms determined or computed by one of the diagonal processors can be broadcast to any corresponding off-diagonal processors. The system can be configured to realize the previously described methodology using, for example, field programmable gate array (FPGA) technology or other such configurable processing environment. In one particular case, each of the diagonal and off-diagonal processors includes a control read only memory (ROM), and the overall array of processors is controlled by a master controller that causes the control ROMs to load or compute the SVD.

The features and advantages described herein are not all-inclusive and, in particular, many additional features and advantages will be apparent to one of ordinary skill in the art viewing the drawings, specification, and claims. Moreover, it should be noted that the language used in the specification has been principally selected for readability and instructional purposes, and not to limit the scope of the inventive subject matter.

DETAILED DESCRIPTION OF THE INVENTION

A two-plane rotation (TPR) approach to Gaussian elimination (Jacobi) is used for computational efficiency in determining rotation parameters. A rotation processor is constructed using the TPR approach to perform SVD on two by two matrices yielding both eigenvalues and left and right eigenvectors. The rotation processor can then be replicated and interconnected to achieve higher dimensioned matrices. For higher dimensional matrices, the rotation processors on the diagonal solve the 2×2 rotation angles, broadcast the results to off-diagonal processors, whereby all processors perform matrix rotations in parallel.

Mathematical Derivation of TPR Approach and Methodology

The mathematical derivation of two-plane rotation approach as used in the singular value decomposition is summarized as follows.

A singular value decomposition (SVD) of a matrix $A \in R^{m \times n}$, yields $USV^T = A$. If m>n, m−n additional row(s) or column(s) of zeros are added such that A is square. Similarly, if m is odd, an additional row and column of zeros are added. An array of 2 by 2 processors are configured in order to match the dimensionality of A (by the factor of $\frac{m}{2} \times \frac{m}{2}$).

A rotation processor will be either a diagonal or off-diagonal processor. A diagonal processor will perform all of the following calculations, whereas an off-diagonal processor will only perform a subset.

Assume the following:

$$A = \begin{bmatrix} a_{11} & a_{12} \\ a_{21} & a_{22} \end{bmatrix} \qquad \text{(Equation 1)}$$

Here, A, represents a 2 by 2 (sub)matrix of A.

Compute the two-plane rotation terms of rotation and reflection ($p_1$, $q_1$, $p_2$, and $q_2$):

$$p_1 = \frac{a_{22} + a_{11}}{2} \qquad \text{(Equation 2)}$$

$$q_1 = \frac{a_{21} - a_{12}}{2} \qquad \text{(Equation 3)}$$

$$p_2 = \frac{a_{22} - a_{11}}{2} \qquad \text{(Equation 4)}$$

$$q_2 = \frac{a_{21} + a_{12}}{2} \qquad \text{(Equation 5)}$$

If the rotation processor is singular (i.e. only solving a 2 by 2 SVD) or if it is a diagonal element in an array (i.e., solving a larger than 2 by 2 SVD wherein it is responsible for a diagonal portion of the overall matrix), it will compute the following equations (6) through (13).

Determine the rotation angles:

$$\varphi = \frac{\tan^{-1}(2^{-(exp(p_2) - exp(q_2))})}{2} \qquad \text{(Equation 6)}$$

$$\gamma = \frac{\tan^{-1}(2^{-(exp(p_2) - exp(q_2))})}{2} \qquad \text{(Equation 7)}$$

$$s_1 = \text{sign}(p_1) \text{ AND } \text{sign}(q_1) \qquad \text{(Equation 8)}$$

$$s_2 = \text{sign}(p_2) \text{ AND } \text{sign}(q_2) \qquad \text{(Equation 9)}$$

where exp( ) represents the exponential component of the floating point number and sign( ) represents the sign-bit component of the floating point number.

Compute the primary rotation terms:

$$\sin \theta_R = s_2 \sin \gamma \cos \varphi + s_1 \cos \gamma \sin \varphi \qquad \text{(Equation 10)}$$

$$\sin \theta_L = s_2 \sin \gamma \cos \varphi - s_1 \cos \gamma \sin \varphi \qquad \text{(Equation 11)}$$

$$\cos \theta_R = \cos \gamma \cos \varphi - s_1 s_2 \sin \gamma \sin \varphi \qquad \text{(Equation 12)}$$

$$\cos \theta_L = \cos \gamma \cos \varphi + s_1 s_2 \sin \gamma \sin \varphi \qquad \text{(Equation 13)}$$

Results of Equations 10 through 13 are broadcast to off-diagonal processors (if any). Note that $\sin \theta_R$ and $\cos \theta_R$ are only consumed by rotation processors along the same matrix column as the diagonal processor. Similarly $\sin \theta_L$ and $\cos \theta_L$ are only consumed by rotation processors along the same matrix row as the diagonal processor.

Compute the local rotation terms:

$$\sin\theta_+ = \sin\theta_R \cos\theta_L + \cos\theta_R \sin\theta_L \quad \text{(Equation 14)}$$

$$\cos\theta_+ = \cos\theta_R \cos\theta_L - \sin\theta_R \sin\theta_L \quad \text{(Equation 15)}$$

$$\sin\theta_- = \sin\theta_R \cos\theta_L - \cos\theta_R \sin\theta_L \quad \text{(Equation 16)}$$

$$\cos\theta_- = \cos\theta_R \cos\theta_L + \sin\theta_R \sin\theta_L \quad \text{(Equation 17)}$$

Compute the updated two-plane rotation terms:

$$r_1 = p_1 \cos\theta_- + q_1 \sin\theta_- \quad \text{(Equation 18)}$$

$$t_1 = q_1 \cos\theta_- - p_1 \sin\theta_- \quad \text{(Equation 19)}$$

$$r_2 = p_2 \cos\theta_+ + q_2 \sin\theta_+ \quad \text{(Equation 20)}$$

$$t_2 = q_2 \cos\theta_+ - p_2 \sin\theta_+ \quad \text{(Equation 21)}$$

Form the updated matrix:

$$A' = \begin{bmatrix} r_1 - r_2 & t_2 + t_1 \\ t_1 - t_2 & r_1 + r_2 \end{bmatrix} \quad \text{(Equation 22)}$$

Optionally, the left and right matrices can also be calculated using Equations 18 through 22, where $p_1$, $q_1$, $p_2$ and $q_2$ are re-derived from Equations 2 through 5 with the substitution of the locally stored version of the U and V 2×2 (sub) matrices in lieu of A. Note that Equations 14 through 17 need not be re-derived for the left and right matrices.

2×2 Scalable Rotation Processor Architecture

Figure 1:
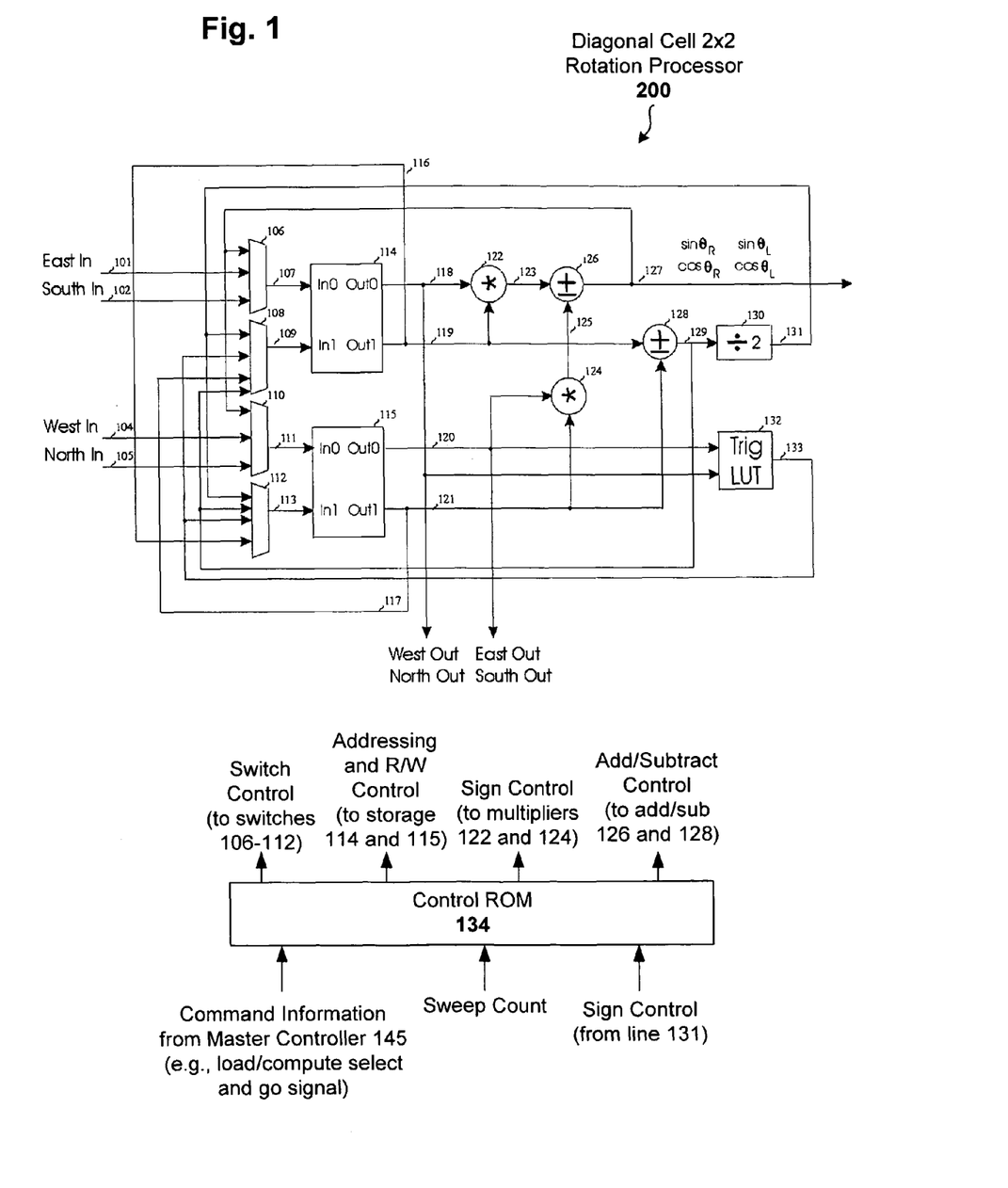
FIG. 1 illustrates the architecture for a diagonal cell 2×2 rotation processor configured in accordance with one embodiment of the present invention.
Figure 2:
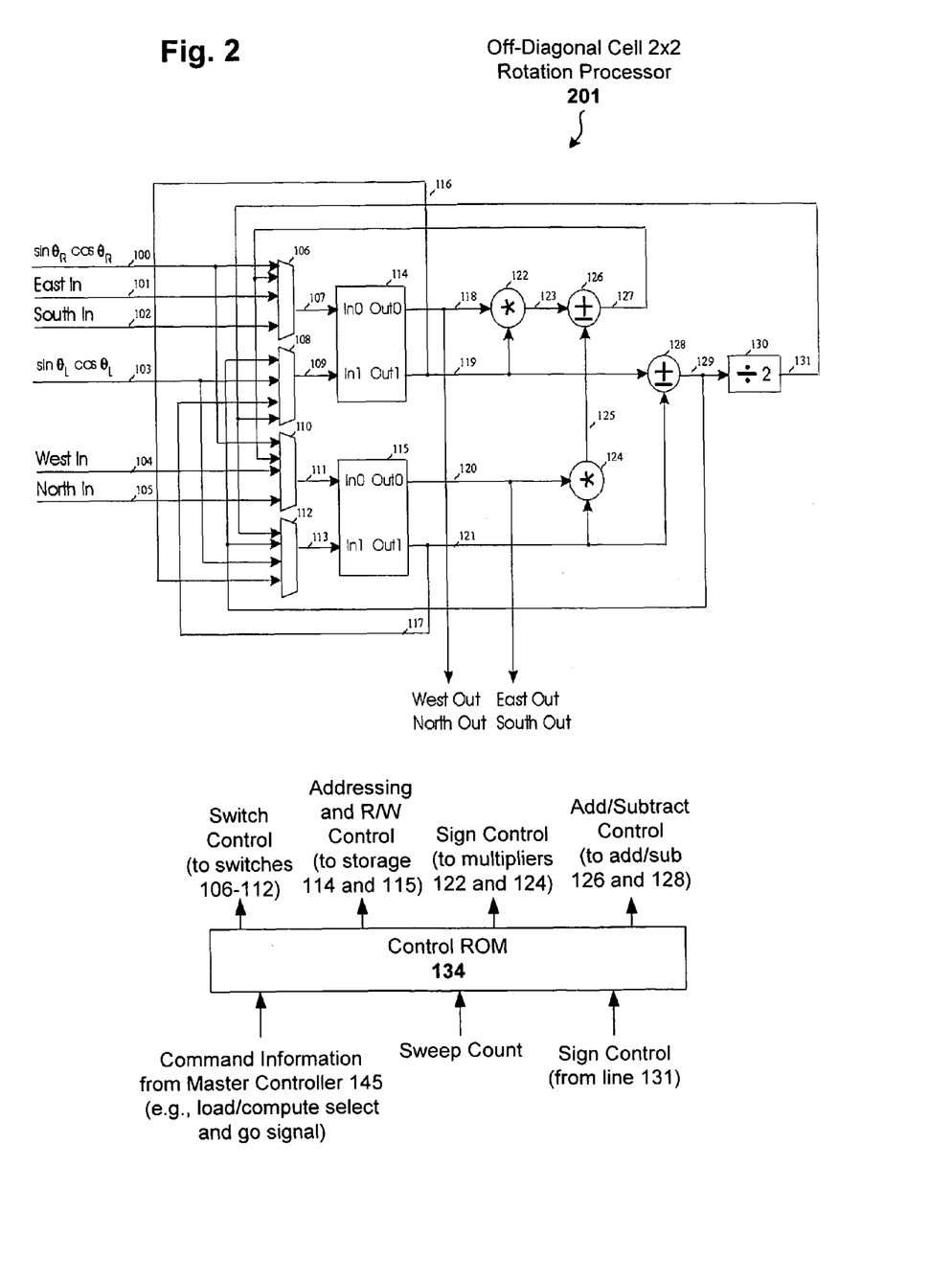
FIG. 2 illustrates the architecture for an off-diagonal cell 2×2 rotation processor configured in accordance with one embodiment of the present invention.

The 2×2 scalable rotation processor configured in accordance with the principles of the present invention is presented as either a diagonal cell 2×2 rotation processor 200 (shown in FIG. 1), or as an off-diagonal cell 2×2 rotation processor 201 (shown in FIG. 2). This 2×2 rotation processor architecture realizes Equations 1 through 22 previously given in the mathematical derivation of TPR approach, which culminates in a system for computing the SVD.

As can be seen, each of the processors 200 and 201 include dual-ported storage elements 114 and 115, multipliers 122 and 124, adder/subtractor modules 126 and 128, divide-by-2 function 130, a control ROM 134, and a series of switches 106, 108, 110, and 112. Thus, the diagonal cell processor 200 and off-diagonal cell processor 201 are internally configured in a similar fashion. However, note that the diagonal cell processor 200 further includes a trigonometric lookup table (trig LUT) function 132 that is lacking in the off-diagonal cell processor 201. In addition, the off-diagonal cell processor 201 includes a means of receiving trigonometric information having a known sequence and timing (sin $\theta_R$ and cos $\theta_R$ on line 100, and sin $\theta_L$ cos $\theta_L$ on line 103) from line 127 of neighboring diagonal cell processors 200. The related differences in switching and connectivity will be apparent in light of this disclosure.

The control ROM 134 receives command information from a master controller 145 (to be discussed with reference to FIGS. 3-5). The command information determines whether the processors 200/201 are loading or computing (load/compute select), along with the relevant starting and ending addresses of the control ROM 134. The command information also provides an enable signal that synchronizes the cell processor 200/201 operation (go signal) with that of other processor cells 200/201. The control ROM 134 also receives a sweep count signal, which is a parameter indicating how many compute cycles to execute. The control ROM 134 also receives the signal output by the divide-by-2 function 130, thereby enabling sign control of the multipliers 122/124. The control ROM 134 outputs a number of control signals, including switch control (to switches 106, 108, 110, and 112), sign control (to multipliers 122 and 124), and add/subtract control (to adder/subtractor modules 126 and 128). The control ROM 134 also outputs addressing information (two for storage element 114 and two for storage element 115), as well as read/write (R/W) control for the storage elements 114 and 115.

The 2×2 rotation processor architectures of FIGS. 1 and 2 each support four mathematical operations (M1, M2, M3, and M4) and six control operations (C1, C2, C3, C4, C5, and C6):

$$M1 - f(a, x, b, y) = ax \pm by;$$

$$M2 - f(x, y) = \frac{x+y}{2};$$

$$M3 - f(x, y) = x \pm y;$$

$$M4 - f(x, y) = \sin\left(\tan^{-1}\left(\frac{2^{-exp(x)-exp(y)}}{2}\right)\right) \& f(x,y)$$

$$= \cos\left(\tan^{-1}\left(\frac{2^{-exp(x)-exp(y)}}{2}\right)\right);$$

C1—transfer(x);
C2—exchange_East-West(S,U);
C3—exchange_East-West (S,U,V);
C4—exchange_North-South(S,V);
C5—receive(sin $\theta_R$, cos $\theta_R$); and
C6—receive(sin $\theta_L$, cos $\theta_L$).

Mathematical operation M1 is achieved with simultaneous retrieval of the four operands (a, x, b, and y) from storage 114 and 115, as addressed by control ROM 134, thereby driving lines 118, 119, 120, and 121. Multipliers 122 and 124 produce the results of ax and by on lines 123 and 125, respectively. The adder/subtractor module 126 performs the sum or difference (as determined by the add/subtract control from control ROM 134), and drives line 127. The result on line 127 drives switches 106 and 110. The corresponding control ROM 134 routes the result from the switches 106 and 110 to the proper address in storage 114 and 115, via respective lines 107 and 111. Mathematical operation M1 is used to directly achieve Equations 10 through 21. For Equations 10 through 13, the control ROM 134 gates the sign terms of Equations 8 and 9 (sign control) to the appropriate multipliers 122 and 124.

Mathematical operation M2 is achieved with simultaneous retrieval of the two operands (x and y) from storage 114 and 115, as addressed by control ROM 134, thereby driving lines 119 and 121. The adder/subtractor module 128 performs the sum or difference, as determined by the add/subtract control of the control ROM 134, and drives line 129. A division by two is then performed via the divide-by-2 function 130, which drives line 131 with the result. The result on line 131 drives switches 108 and 112. The control ROM 134 routes (using the appropriate switch control signals) the result from the switches 108 and 112 to the proper address in storage 114 and 115, via respective lines 109 and 113. Mathematical operation M2 is used to directly achieve Equations 2 through 5. The control ROM 134 notes the signs of the terms on line 131 to accomplish Equations 8 and 9.

Mathematical operation M3 follows similarly from mathematical operation M2. The two operands (x and y) are simultaneously retrieved from storage 114 and 115, as addressed by control ROM 134, thereby driving lines 119 and 121. The adder/subtractor module 128 performs the sum or difference, as determined by the add/subtract control of the control ROM 134, and drives line 129. The result on line 129 drives switches 108 and 112. The control ROM 134 routes (using the appropriate switch control signals) the result from the switches 108 and 112 to the proper address in storage 114 and 115, via respective lines 109 and 113. Mathematical operation M3 is used to directly achieve Equation 22.

Mathematical operation M4 is only instanced in the diagonal cell processor 200. The angle terms are simultaneously retrieved from storage 114 and 115, as addressed by control ROM 134, thereby driving lines 118 and 120. The trig LUT function 132 computes the sin and cos terms on alternating clock cycles, and drives line 133. In practice, the angle terms are low-ordered integers. As implemented in this example, the trig LUT function 132 takes the difference of the exponents of the angle terms (trivial for a floating point number) and uses the result to index into a 32-entry lookup table (16 sin and 16 cos terms). The result on line 133 drives switches 108 and 112. The control ROM 134 routes (using the appropriate switch control signals) the result from the switches to the proper address in storage 114 and 115, via lines 109 and 113. Mathematical operation M4 is used to directly achieve Equations 6 and 7 and the subterms of Equations 10 through 13.

Control operation C1 is used to transfer a variable between storage 114 and 115. The control ROM 134 can initiate a transfer from 114 to 115, or 115 to 114 with appropriate addressing and control (addressing and R/W control signals) of the storage elements. A transfer from storage 114 to 115 would present the variable on line 116 (which is connected to line 119) to switch 112 driving line 113, via the setting of the control ROM 134. Similarly, a transfer from storage 115 to 114 would present the variable on line 117 (which is connected to line 121) to switch 108 driving line 109, via the setting of the control ROM 134.

Control operation C2 is used to transfer variables between neighboring cells, for both diagonal processors 200 and off-diagonal processors 201, along a row (East-West). The control ROM 134 selects the even column of S and U in storage 114 and presents them on line 118. Simultaneously, the control ROM 134 replaces the even column of S and U in storage 114 with the terms present on line 101, which are driven on line 107 by switch 106. Similarly, the control ROM 134 selects the odd column of S and U in storage 115 and present them on line 120. Simultaneously, the control ROM 134 replaces the odd column of S and U in storage 115 with the terms present on line 104, which are driven on line 111 by switch 110.

Control operation C3 is the same as control operation C2, except with the additional transfer of the even and odd columns of V.

Control operation C4 is used to transfer variables between neighboring cells, both diagonal processors 200 and off-diagonal processors 201, along a column (North-South). The control ROM 134 selects the even row of S and V in storage 114 and presents them on line 118. Simultaneously, the control ROM 134 replaces the even row of S and V in storage 114 with the terms present on line 102, which are driven on line 107 by switch 106. Similarly, the control ROM 134 selects the odd row of S and V in storage 115 and present them on line 120. Simultaneously, the control ROM 134 replaces the odd row of S and V in storage 115 with the terms present on line 105, which are driven on line 111 by switch 110.

Control operation C5 is used by the off-diagonal cell processors 201 to receive trigonometric terms from a diagonal cell processor 200 on the same column. In particular, the diagonal cell processor 200 drives line 100 of the off-diagonal cell processor 201, and the control ROM 134 uses switches 106 and 110 to drive lines 107 and 111 and to store the terms in storage 114 and 115, respectively.

Control operation C6 is used by the off-diagonal cell processors 201 to receive trigonometric terms from a diagonal cell processor 200 on the same row. Here, the diagonal cell processor 200 drives line 103, and the control ROM 134 uses switches 108 and 112 to drive lines 109 and 113 and to store the terms in storage 114 and 115, respectively.

Note that the trigonometric terms provided by a diagonal cell processor 200 are provided with a sequence of data with known timing, thereby enabling synchronized and selective receipt of the trigonometric terms by the targeted off-diagonal cell processors 201. Further note that the operation of the processors 200 and 201 are synchronized by a clock signal (not shown). Numerous clocking and synchronization schemes can be used here, as will be apparent in light of this disclosure.

Array Architecture

Figure 3:
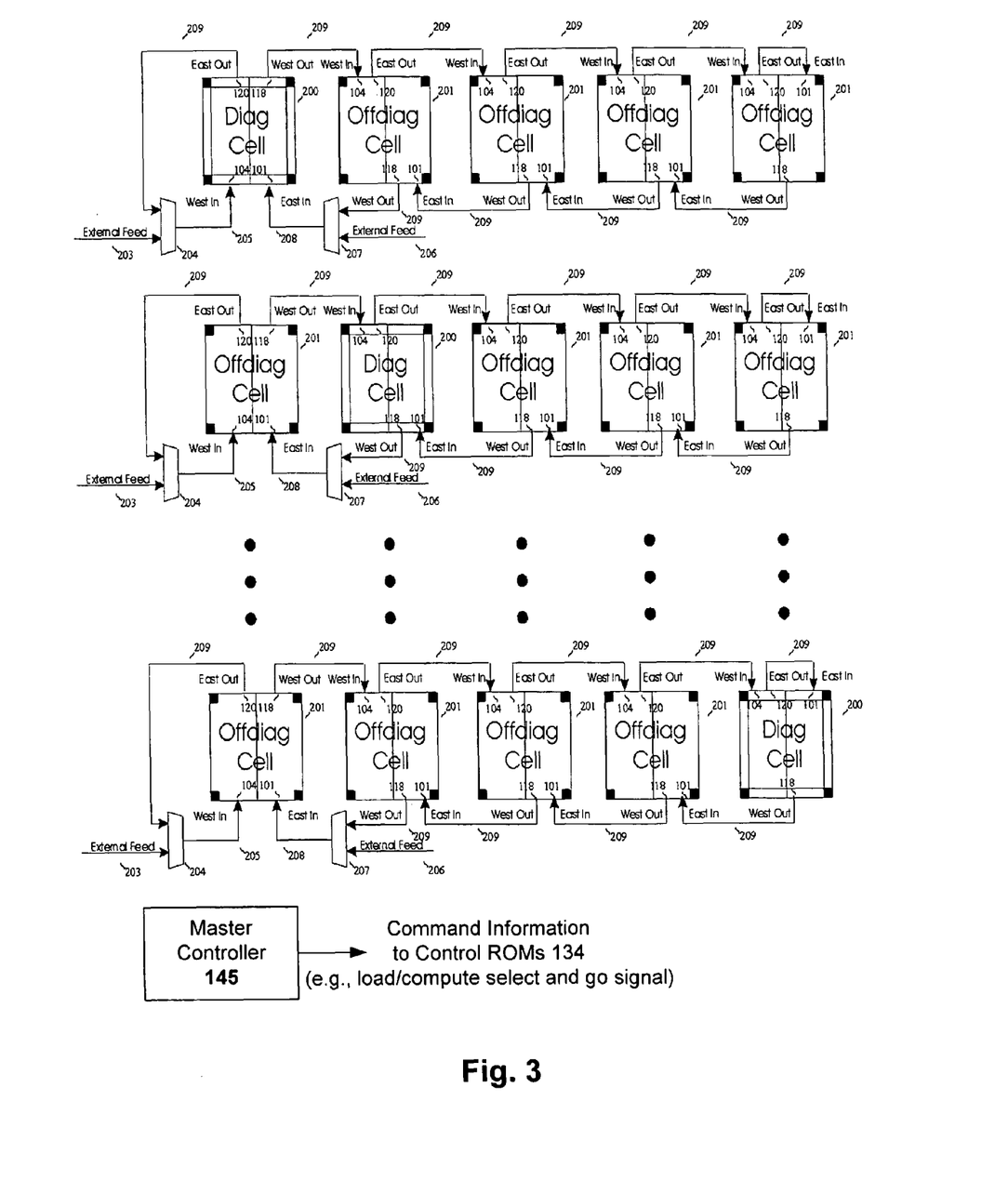
FIGS. 3-5 illustrate an array of 2×2 rotation processors configured for handling decomposition of a matrix, in accordance with one embodiment of the present invention.
Figure 4:
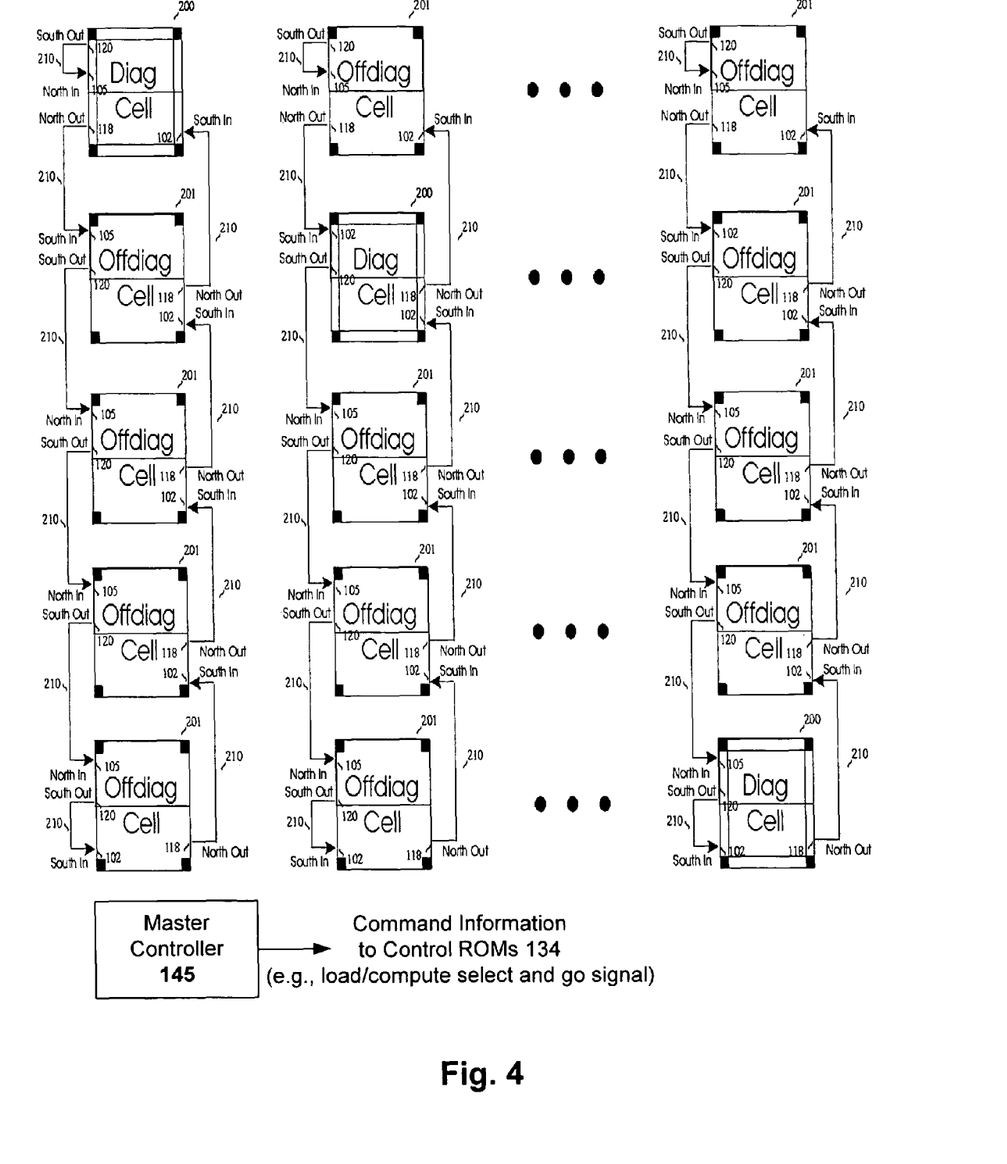
Figure 5:
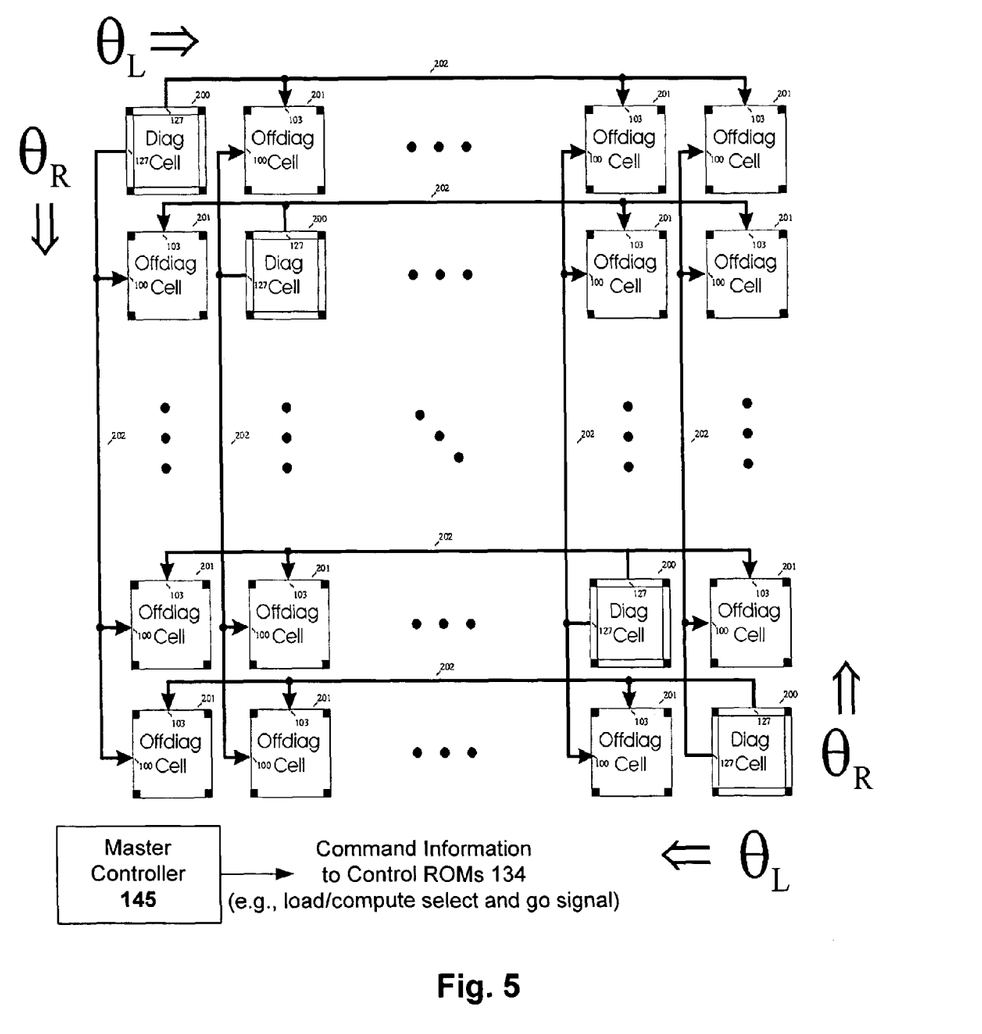

FIGS. 3-5 illustrate an array of 2×2 rotation processors configured for handling decomposition of a matrix, in accordance with one embodiment of the present invention. The architecture includes the computational node and the systolic array interconnects. The processors 200 and 201 can be configured as discussed in reference to FIGS. 1 and 2, and can be implemented, for example, using a field programmable gate array (FPGA) or other such configurable processing environment.

A master controller 145 is configured to provide command information to the control ROMs 134 of each of the processors 200 and 201. As previously explained, the command information determines whether the processors 200/201 are loading or computing (load/compute select), along with the relevant starting and ending addresses of the control ROM 134. The command information also provides an enable signal that synchronizes the cell processor 200/201 operation (go signal) with that of other processor cells 200/201 included in the overall array. This controller 145 can also be implemented with an FPGA or other suitable processing environment. A clock signal or signals can be used to provide synchronization among the processors 200/201 and the master controller 145, for array operation.

In practice, an array of these 2×2 rotation processors are deployed for computing the SVD of A, a matrix of m columns and n rows of numbers. The matrix A is fed to the array of processors, and is decomposed into the S matrix, and optionally the left and right matrices U and V. Recall that A is the input matrix which, over time is supplanted with the S matrix. Technically, A is only used here to represent the first, unaltered, matrix input. After one "sweep" A is transformed into S.

The array configuration illustrated in FIGS. 3 and 5 is capable of handling the decomposition of a 10 by 10 A matrix (one cell per 2 by 2 sub-matrix). The array functions as a Single Instruction, Multiple Data (SIMD) architecture. All cells operate in lockstep via a control ROM 134.

For purposes of discussion, North is toward the top of the page, East is toward the right edge of the page, South is the bottom of the page, and West is the left edge of the page. The connections shown in FIG. 3 provide a means for swapping the U and S values between cell processors, as well as a means for loading the initial values for U, S, and V. Note that U and V are loaded as identity matrices. The connections shown in FIG. 4 provide a means for swapping S and V values between cell processors. The connections shown in FIG. 5 provide a means for broadcasting the trignometric terms derived by the diagonal cell processors 200 to the off-diagonal cell processors 201.

Reading from left to right in FIG. 3, all cell processors not on the East or West most edges of the array connect East Out line 120 of one processor to West In line 104 of the eastern neighbor processor. Similarly, working from right to left for all cell processors, the West Out line 118 of one processor drives East In line 101 of the western neighbor processor. The exceptions for the processors on the West-most edge are that each West-edge processor's East Out line 120 drives its own West In line 104, and each West-edge processor's West Out line 118 drives the West In line 104 of its Eastern neighbor cell processor. The exception for the processors on the East-most edge is that each East-edge processor's East Out line 120 drives its own East In line 101. All of these interconnects are of the same precision using line 209.

Additional logic is shown in FIG. 3 for loading the SVD array. Unloading can be monitored by tapping (e.g., with a probe) any of the lines 209. To load the SVD array, each cell processor 200 and 201 will accept the odd columns of U, A, and V on the West In line 104 and the even columns on the East In line 101. In this particular configuration, at least two switches 204 and 207 per row of cells are needed to allow two external feed lines 203 and 206 to enter values of U, A, and V. Note that external feed lines 203 and 206 can be coupled to, for example, a memory or other storage device that is configured to feed the array.

Thus, FIG. 3 shows connectivity for loading and unloading of the decomposed singular value, S, along with the left and right singular vectors U, V, as well as connectivity for column interchanges of intermediate values of S and U.

FIG. 4 shows connectivity for row interchange of intermediate values of S and V. Reading from the top-down, all cell processors not on the North or South most edges of the array connect the South Out line 120 of one processor to the North In line 105 of the Southern neighbor processor. Similarly, working from bottom-up for all cell processors, the North Out line 118 of one processor drives the South In line 102 of the Northern neighbor processor. The exception for processors on the North-most edge of the array is that each such processor's South Out line 120 drives its own North In line 105. The exception for processors on the South-most edge of the array is that each South-edge processor's South Out line 120 drives its own South In line 102. All of these interconnects are of the same precision using line 210.

FIG. 5 shows the theta interconnects on a per-column or per-row basis. Said differently, FIG. 5 describes the interconnectivity between cells for the delivery of the trigonometric terms. Diagonal cell processors 200 are the drivers, and the off-diagonal cell processors 201 are the receivers. When the terms are generated on line 127 by a diagonal cell processor 200, it drives line 103 of all off-diagonal cell processors 201 on the same row. Line 127 also drives lines 100 of all off-diagonal cell processors 201 on the same column. All of these interconnects between line 127 and lines 100 and 103 are of the same precision using line 202.

The overall array of cell processors 200 and 201, then, is orchestrated by the master controller 145, which essentially instructs the control ROMs 134 in the array to Load or Compute the SVD, and provides a synchronizing go signal.

The pseudo code for each of these operations is now provided. In reviewing the code, assume that U, A, and V are of dimensionality m, with U and V identity matrices, and A being the matrice to be decomposed. Notationally, X(t,:) represents column t of matrix X, and X(:,u) represents row u of matrix X. The odd( ) function returns all odd elements in an ordered sequence, and the even( ) function returns all even elements in an ordered sequence. Each line in the pseudo code is uniquely numbered to indicate sequential processing, and an alphabetical following a set of identical numbers indicates concurrent processing. Each of the Load and Compute commands executes concurrently across all cell processors for both diagonal 200 and off-diagonal 201 cell processors (all cell processors 200 and 201 will all be at the same line number of code at any given time instance).

The pseudo code for the Load operation is shown here:
1. Set switches 204 and 207 to external feed lines 203 and 206;
2. Assert A(1,:) on lines 203;
3. Assert A(3,:) on lines 206;
4. C3;—exchange S,U,V
5. Assert U(1,:) on lines 203;
6. Assert U(3,:) on lines 206;
7. Assert V(1,:) on lines 203;
8. Assert V(3,:) on lines 206;
9. Set switch 204 to line 209;
10. For loop=odd(5 to m)
11. Assert A(loop,:) on lines 206;
12. C3;—exchange S,U,V
13. Assert U(loop,:) on lines 206;
14. Assert V(loop,:) on lines 206;
15. End loop;
16. For loop=even(m-1 down to 2)
17. Assert A(loop,:) on lines 206;
18. C3;—exchange S,U,V
19. Assert U(loop,:) on lines 206;
20. Assert V(loop,:) on lines 206;
21. End loop;
22. Set switch 207 to line 209.

The pseudo code for the Compute for diagonal cell processor 200 only operation is shown here:
1. For loop=1 to log2(m);—sweep count
2. M2;—solve Equations 2 through 5 for A
3. M4;—solve Equations 6 and 7
4a. M1;—solve Equations 10 through 13 for A
4b. M2;—solve Equations 2 through 5 for U
5a. M1;—solve Equations 10 through 13 for U
5b. M2;—solve Equations 2 through 5 for V
6. M1;—solve Equations 10 through 13 for V
7. M1;—solve Equations 14 through 17 for A
8. M1;—solve Equations 14 through 17 for U
9. M1;—solve Equations 14 through 17 for V
10. M1;—solve Equations 18 through 21 for A
11. M1;—solve Equations 18 through 21 for U
12. M1;—solve Equations 18 through 21 for V
13. M3;—solve Equations 22 for A
14. M3;—solve Equation 22 for U
15. M3;—solve Equation 22 for V
16. C2;—exchange A
17a. C2;—exchange U
17b. C1;—transfer A
18. C4;—exchange A
19. C4;—exchange V
20. End loop.

The pseudo code for the Compute for off-diagonal cell processor 201 only operation is shown here:
1. For loop=1 to log2(m)
2. M2;—solve Equations 2 through 5 for A
3. NOP;—no operation
4a. C5;—receive solutions to Equations 10 through 13 for A
4b. C6;—receive solutions to Equations 10 through 13 for A
4c. M2;—solve Equations 2 through 5 for U 5a. C5;—receive solutions to Equations 10 through 13 for U
5b. C6;—receive solutions to Equations 10 through 13 for U
5c. M2;—solve equations 2 through 5 for V
6a. C5;—receive solutions to Equations 10 through 13 for V
6b. C6;—receive solutions to Equations 10 through 13 for V
7. M1;—solve Equations 14 through 17 for A
8. M1;—solve Equations 14 through 17 for U
9. M1;—solve Equations 14 through 17 for V
10. M1;—solve Equations 18 through 21 for A
11. M1;—solve Equations 18 through 21 for U
12. M1;—solve Equations 18 through 21 for V
13. M3;—solve Equation 22 for A
14. M3;—solve Equation 22 for U
15. M3;—solve Equation 22 for V
16. C2;—exchange A
17a. C2;—exchange U
17b. C1;—transfer A
18. C4;—exchange A
19. C4;—exchange V
20. End loop.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for performing singular value decomposition (SVD) of a matrix using two-plane rotation, comprising:
computing two-plane rotation terms of rotation and reflection in a rotation processor based on elements of the matrix, wherein the rotation processor comprises:
an array of 2 by 2 processors including diagonal processors and off-diagonal processors, each comprising a control read-only memory (ROM), and
a master controller configured to control the array of 2 by 2 processors and cause the control ROMs to load or compute the SVD;
determining rotation angles in the diagonal processors of the rotation processor based on the two-plane rotation terms;
determining sign terms in the diagonal processors of the rotation processor based on the two-plane rotation terms;
computing primary rotation terms in the diagonal processors of the rotation processor based on the rotation angles and the sign terms, wherein at least part of computation of the primary rotation terms in the rotation processor is based on a trigonometric value from a trigonometric lookup table, wherein the trigonometric lookup table does not calculate the trigonometric value, wherein the primary rotation terms comprise $\sin \theta_R$, $\sin \theta_L$, $\cos \theta_R$, and $\cos \theta_L$, where $\sin \theta_R = s_2 \sin \gamma \cos \phi + s_1 \cos \gamma \sin \phi$, $\sin \theta_L = s_2 \sin \gamma \cos \phi - s_1 \cos \gamma \sin \phi$, $\cos \theta_R = \cos \gamma \cos \phi - s_1 s_2 \sin \gamma \sin \phi$, and $\cos \theta_L = \cos \gamma \cos \phi + s_1 s_2 \sin \gamma \sin \phi$;
wherein determining the rotation angles, determining the sign terms, and computing the primary rotation terms each produce results and are only performed if solving a 2 by 2 SVD or if solving a diagonal portion of an overall matrix that is larger than a 2 by 2 SVD;
broadcasting the results relevant to solving any corresponding off-diagonal portions;
computing local rotation terms in the rotation processor based on the primary rotation terms, wherein the local rotation terms are $\sin \theta_+$, $\cos \theta_+$, $\sin \theta_-$, and $\cos \theta_-$, where $\sin \theta_+ = \sin \theta_R \cos \theta_L + \cos \theta_R \sin \theta_L$, $\cos \theta_+ = \cos \theta_R \cos \theta_L - \sin \theta_R \sin \theta_L$, $\sin \theta_- = \sin \theta_R \cos \theta_L - \cos \theta_R \sin \theta_L$, and $\cos \theta_- = \cos \theta_R \cos \theta_L + \sin \theta_R \sin \theta_L$;
computing updated two-plane rotation terms in the rotation processor based on the local rotation terms and the two-plane rotation terms; and
forming an updated matrix in the rotation processor based on the updated two-plane rotation terms.

2. The method of claim 1, wherein the matrix is a matrix or sub-matrix $$A = \begin{bmatrix} a_{11} & a_{12} \\ a_{21} & a_{22} \end{bmatrix},$$

and the two-plane rotation terms are $p_1$, $q_1$, $p_2$, and $q_2$, where $$p_1 = \frac{a_{22} + a_{11}}{2}, q_1 = \frac{a_{21} - a_{12}}{2},$$
$$p_2 = \frac{a_{22} - a_{11}}{2}, \text{ and } q_2 = \frac{a_{21} + a_{12}}{2}.$$

3. The method of claim 2, wherein the rotation angles are $\phi$ and $\gamma$, where $$\varphi = \frac{\tan^{-1}(2^{-(exp(p_2)-exp(q_2))})}{2} \text{ and } \gamma = \frac{\tan^{-1}(2^{-(exp(p_2)-exp(q_2))})}{2},$$

where exp( ) represents an exponential component of a floating point number.

4. The method of claim 3, wherein the sign terms are $s_1$ and $s_2$, where $s_1 = \text{sign}(p_1)$ AND $\text{sign}(q_1)$ and $s_2 = \text{sign}(p_2)$ AND $\text{sign}(q_2)$, where sign( ) represents a sign-bit component of the floating point number.

5. The method of claim 4 wherein the updated two-plane rotation terms are $r_1$, $t_1$, $r_2$, and $t_2$, where $r_1 = p_1 \cos \theta_- + q_1 \sin \theta_-$, $t_1 = q_1 \cos \theta_- - p_1 \sin \theta_-$, $r_2 = p_2 \cos \theta_+ + q_2 \sin \theta_+$, and $t_2 = q_2 \cos \theta_+ - p_2 \sin \theta_+$.

6. The method of claim 5, wherein the updated matrix is $$A' = \begin{bmatrix} r_1 - r_2 & t_2 + t_1 \\ t_1 - t_2 & r_1 + r_2 \end{bmatrix}.$$

7. A system for performing singular value decomposition (SVD) of a matrix using two-plane rotation, comprising:
an array of 2 by 2 rotation processors configured to match a dimensionality of the matrix, with each rotation processor being a diagonal or an off-diagonal processor, wherein each of the rotation processors includes a control read-only memory (ROM);
a master controller configured to control the array of 2 by 2 processors and cause the control ROMs to load or compute the SVD; and
at least one trigonometric lookup table,
wherein the diagonal processors are configured to:
compute two-plane rotation terms of rotation and reflection based on elements of the matrix;

determine rotation angles based on the two-plane rotation terms;

determine sign terms based on the two-plane rotation terms;

compute primary rotation terms based on the rotation angles and the sign terms, wherein at least part of computation is based on at least one value from the trigonometric lookup table, wherein the primary rotation terms are $\sin\theta_R$, $\sin\theta_L$, $\cos\theta_R$, and $\cos\theta_L$, where $\sin\theta_R = s_2 \sin\gamma \cos\phi + s_1 \cos\gamma \sin\phi$, $\sin\theta_L = s_2 \sin\gamma \cos\phi - s_1 \cos\gamma \sin\phi$, $\cos\theta_R = \cos\gamma \cos\phi - s_1 s_2 \sin\gamma \sin\phi$, and $\cos\theta_L = \cos\gamma \cos\phi + s_1 s_2 \sin\gamma \sin\phi$;

compute local rotation terms based on the primary rotation terms, wherein the local rotation terms are $\sin\theta_+$, $\cos\theta_+$, $\sin\theta_-$, and $\cos\theta_{31}$, where $\sin\theta_+ = \sin\theta_R \cos\theta_L + \cos\theta_R \sin\theta_L$, $\cos\theta_+ = \cos\theta_R \cos\theta_L - \sin\theta_R \sin\theta_L$, $\sin\theta_- = \sin\theta_R \cos\theta_L - \cos\theta_R \sin\theta_L$, and $\cos\theta_- = \cos\theta_R \cos\theta_L + \sin\theta_R \sin\theta_L$;

compute updated two-plane rotation terms based on the local rotation terms and the two-plane rotation terms; and form an updated matrix, wherein the rotation angles, sign terms, and primary rotation terms determined or computed by one of the diagonal processors are broadcast to any corresponding off-diagonal processors; and the off-diagonal processors are configured to:

compute two-plane rotation terms of rotation and reflection based on elements of the matrix;

compute local rotation terms based on the primary rotation terms;

compute updated two-plane rotation terms based on the local rotation terms and the two-plane rotation terms; and form an updated matrix based on the updated two-plane rotation terms.

8. The system of claim 7, wherein the matrix is a matrix or sub-matrix, $$A = \begin{bmatrix} a_{11} & a_{12} \\ a_{21} & a_{22} \end{bmatrix}$$

and the two-plane rotation terms are $p_1$, $q_1$, $p_2$, and $q_2$, where $$p_1 = \frac{a_{22} + a_{11}}{2}, q_1 = \frac{a_{21} - a_{12}}{2},$$
$$p_2 = \frac{a_{22} - a_{11}}{2}, \text{ and } q_2 = \frac{a_{21} + a_{12}}{2}.$$

9. The system of claim 8, wherein the rotation angles are $\phi$ and $\gamma$, where $$\varphi = \frac{\tan^{-1}(2^{-(exp(p_2)-exp(q_2))})}{2} \text{ and}$$
$$\gamma = \frac{\tan^{-1}(2^{-(exp(p_2)-exp(q_2))})}{2},$$

where exp( ) represents an exponential component of a floating point number.

10. The system of claim 9, wherein the sign terms are $s_1$ and $s_2$, where $s_1 = \text{sign}(p_1)$ AND $\text{sign}(q_1)$ and $s_2 = \text{sign}(p_2)$ AND $\text{sign}(q_2)$, where sign( ) represents a sign-bit component of the floating point number.

11. The system of claim 10, wherein the updated two-plane rotation terms are $r_1$, $t_1$, $r_2$, and $t_2$, where $r_1 = p_1 \cos\theta_- + q_1 \sin\theta_-$, $t_1 = q_1 \cos\theta_- - p_1 \sin\theta_-$, $r_2 = p_2 \cos\theta_+ + q_2 \sin\theta_+$, and $t_2 = q_2 \cos\theta_+ - p_2 \sin\theta_+$.

12. The system of claim 11, wherein the updated matrix is $$A' = \begin{bmatrix} r_1 - r_2 & t_2 + t_1 \\ t_1 - t_2 & r_1 + r_2 \end{bmatrix}.$$

* * * * *

UNITED STATES PATENT AND TRADEMARK OFFICE
CERTIFICATE OF CORRECTION

PATENT NO. : 7,937,425 B2
APPLICATION NO. : 11/046377
DATED : May 3, 2011
INVENTOR(S) : Krawiec et al.

It is certified that error appears in the above-identified patent and that said Letters Patent is hereby corrected as shown below:

Title page, item (56), under "Other Publications", in Column 2, Line 15, delete "Gernation" and insert -- Generation --.

Title page 2, item (56), under "Other Publications", in Column 1, Line 9, delete "Implemenation" and insert -- Implementation --.

Title page 2, item (56), under "Other Publications", in Column 1, Lines 17-18, delete "Trasactions" and insert -- Transactions --.

Title page 2, item (56), under "Other Publications", in Column 2, Line 6, delete "Symetric" and insert -- Symmetric --.

Column 12, line 26, in Claim 2, delete "$q_2 = \dfrac{a_{21} + a_{12}}{2}.$" and insert -- $q_2 = \dfrac{a_{21} + a_{12}}{2}.$ --.

Column 12, line 37, in Claim 3, delete "exp()represents" and insert -- exp() represents --.

Column 12, line 50, in Claim 6, delete "$A' = \begin{bmatrix} r_1 - r_2 & t_2 + t_1 \\ t_1 - t_2 & r_1 + r_2 \end{bmatrix}.$" and Signed and Sealed this
Twenty-fourth Day of April, 2012

David J. Kappos
*Director of the United States Patent and Trademark Office*

CERTIFICATE OF CORRECTION (continued)
U.S. Pat. No. 7,937,425 B2 insert -- $A' = \begin{bmatrix} r_1 - r_2 & t_1 + t_2 \\ t_1 - t_2 & r_1 + r_2 \end{bmatrix}.$ --.

Column 13, line 17, in Claim 7, delete "cos $\theta_{31}$," and insert -- cos $\theta$., --.

Column 14, line 11, in Claim 8, delete "$q_2 = \dfrac{a_{21} + a_{12}}{2}.$" and insert -- $q_2 = \dfrac{a_{21} + a_{12}}{2}.$ --.

Column 14, line 24, in Claim 9, delete "exp()represents" and insert -- exp() represents --.

Column 14, line 37, in Claim 12, delete "$A' = \begin{bmatrix} r_1 - r_2 & t_2 + t_1 \\ t_1 - t_2 & r_1 + r_2 \end{bmatrix}.$" and insert -- $A' = \begin{bmatrix} r_1 - r_2 & t_1 + t_2 \\ t_1 - t_2 & r_1 + r_2 \end{bmatrix}.$ --.